US009229459B2

(12) United States Patent
Goodrich

(10) Patent No.: US 9,229,459 B2
(45) Date of Patent: Jan. 5, 2016

(54) SATURATION CONTROL OF MAGNETIC CORES OF BIDIRECTIONAL DEVICES

(71) Applicant: Hamilton Sundstrand Corporation, Windsor Locks, CT (US)

(72) Inventor: Timothy Arn Goodrich, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 92 days.

(21) Appl. No.: 14/244,083

(22) Filed: Apr. 3, 2014

(65) Prior Publication Data

US 2015/0286228 A1 Oct. 8, 2015

(51) Int. Cl.

| | |
|---|---|
| ***H02J 3/12*** | (2006.01) |
| ***G05F 1/00*** | (2006.01) |
| ***G05F 1/12*** | (2006.01) |
| ***G05F 1/635*** | (2006.01) |
| ***H02M 7/757*** | (2006.01) |
| ***G05F 1/32*** | (2006.01) |

(52) U.S. Cl.
CPC .......................................... *G05F 1/32* (2013.01)

(58) Field of Classification Search
USPC ............... 323/241, 246, 293, 294; 363/74–79
See application file for complete search history.

(56) References Cited

U.S. PATENT DOCUMENTS 5,715,150 A 2/1998 Stava
6,765,808 B1 * 7/2004 Jin .................... H02M 3/33523 363/131
2008/0101096 A1 * 5/2008 Takayanagi ........... H02J 7/0013 363/17
2012/0032517 A1 * 2/2012 Ido ...................... H02M 3/3376 307/77

FOREIGN PATENT DOCUMENTS

WO 99/14844 A1 3/1999

OTHER PUBLICATIONS

European Search Report dated Nov. 2, 2015, for corresponding European Patent Application No. 15162034.

* cited by examiner

*Primary Examiner* — Adolf Berhane
*Assistant Examiner* — Gary Nash
(74) *Attorney, Agent, or Firm* — Kinney & Lange, P.A.

(57) ABSTRACT

A system for controlling saturation of a magnetic core of a transformer includes a transformer control circuit, a Hall sensor, and a processor. The transformer control circuit is configured to provide cycles of bidirectional excitation to the transformer at a first frequency and a first duty cycle. The Hall sensor is configured to output a first field value of the magnetic core during a first half-cycle of each of the cycles of bidirectional excitation and a second field value during a second half-cycle of each of the cycles of bidirectional excitation. The processor is configured to increase the first duty cycle to a second duty cycle in response to a magnitude of the first field value exceeding a first threshold magnitude. The processor is further configured to increase the first frequency to a second frequency in response to both the magnitude of the first field value exceeding the first threshold magnitude and the magnitude of the second field value exceeding a second threshold magnitude.

15 Claims, 4 Drawing Sheets

SATURATION CONTROL OF MAGNETIC CORES OF BIDIRECTIONAL DEVICES

BACKGROUND

The present invention relates generally to transformers, and in particular to a system and method of controlling saturation of magnetic cores of bi-directionally driven transformers.

Transformers, such as those utilized in DC-DC converters for switching power supplies, often include magnetic cores. These magnetic cores store a magnetic field based upon the field generated by current flowing through the primary winding(s) of the transformer. The generated field is dependent upon the number of turns and the core cross-sectional area of the transformer, as well as the magnitude of current flowing through the transformer. Magnetic saturation may occur within the core when the generated field is no longer capable of further increasing the magnetization of the core. This results in the output voltage of the transformer falling to zero, as well as overheating of the transformer.

In systems such as DC-DC converters, bi-directional current is often provided to excite the transformer. In past systems, saturation of the magnetic core has been detected by sensing the primary current of the transformer and comparing the sensed current with a saturation threshold. However, the use of a current sensor or sense resistor is limited in that it is only capable of detecting a transformer output indicative of saturation based upon a perceived saturation threshold.

Operating regions of magnetic cores, as illustrated in hysteresis charts ("BH loops"), include both linear and non-linear regions. Magnetic cores operate in the linear region up until a "knee-point" of the BH loop for the magnetic core. Following the "knee-point," magnetization of the core changes at a non-linear rate and moves into saturation. Due to temperature effects on permeability, core volume (tolerances of core size), variation in manufacturing and other external tolerances (i.e., tolerances of a current sensor), a saturation threshold has been selected conservatively to ensure it remains within the linear range. Because the output current level of the transformer is not indicative of an operating point of the magnetic core, controls implemented based upon the current sensor may lead to problems such as, for example, direct current offsets within the magnetic core which reduce the operating range of the transformer.

SUMMARY

A system for controlling saturation of a magnetic core of a transformer includes a transformer control circuit, a Hall sensor, and a processor. The transformer control circuit is configured to provide cycles of bidirectional excitation to the transformer at a first frequency and a first duty cycle. The Hall sensor is configured to output a first field value of the magnetic core during a first half-cycle of each of the cycles of bidirectional excitation and a second field value during a second half-cycle of each of the cycles of bidirectional excitation. The processor is configured to increase the first duty cycle to a second duty cycle in response to a magnitude of the first field value exceeding a first threshold magnitude. The processor is further configured to increase the first frequency to a second frequency in response to both the magnitude of the first field value exceeding the first threshold magnitude and the magnitude of the second field value exceeding a second threshold magnitude.

DETAILED DESCRIPTION

A system and method is disclosed herein for controlling magnetic saturation of transformer cores. The system includes a transformer, a digital signal processor, a transformer control circuit, and a bipolar Hall Effect sensor. The transformer may be driven by cycles of bidirectional current at a selected frequency and duty cycle. The Hall sensor provides a reading to the digital signal processor indicative of the magnetization of the magnetic core of the transformer. The digital signal processor compares the Hall sensor reading with threshold values based upon, for example, a hysteresis chart (also known as a "BH loop") for the core.

If the Hall sensor reading indicates that the magnitude of the magnetization of the core exceeds a first threshold magnitude, the processor detects a possible offset condition. To counteract the effects of the possible offset condition, the digital signal processor increases the duty cycle of the following half-cycle of excitation. If the magnitude of the sensor output following the increased duty cycle exceeds a second threshold magnitude, the processor detects core saturation. Upon detection of core saturation, the processor increases the frequency of the cycles of bidirectional current. The processor continues to increase the frequency, for example, each cycle until the Hall sensor indicates that the magnitude of the magnetic field of the core no longer exceeds the second threshold.

Figure 1:
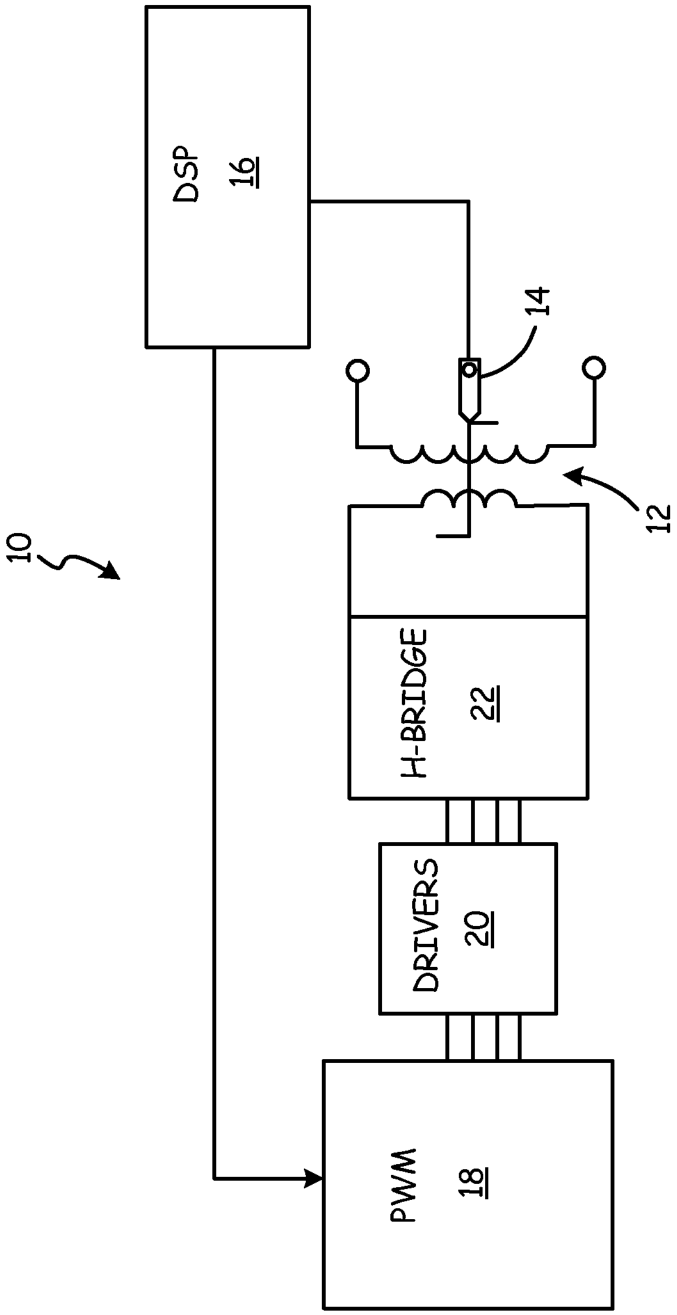
FIG. 1 is a block diagram illustrating a system for controlling magnetic saturation of transformer cores.

FIG. 1 is a block diagram illustrating system 10 for controlling magnetic saturation of transformer cores. System 10 includes transformer 12, Hall sensor 14, digital signal processor 16, pulse-width modulator 18, drivers 20, and H-bridge 22. System 10 may be utilized, for example, in a DC-DC converter for a switching power supply. Transformer 12 is any transformer that includes, for example, a ferromagnetic core. Pulse-width modulator 18, drivers 20 and H-Bridge 22 combine to form a transistor control circuit. While illustrated in FIG. 1 as including pulse-width modulator 18, drivers 20 and H-Bridge 22, any circuit may be implemented that is capable of providing controlled bidirectional excitation of transformer 12.

Transformer 12 may be bi-directionally driven through H-bridge 22 to provide excitation for transformer 12. H-bridge 22 may be implemented, for example, using four switches, such as insulated gate bipolar transistors (IGBT's), metal-oxide-semiconductor field-effect transistors (MOSFETs), or as any other circuit capable of providing controlled bi-directional excitation for transformer 12. Drivers 20 provide, for example, control signals to operate the switches of H-bridge 22.

Excitation of transformer 12 may comprise cycles of bidirectional current at a selected frequency. Each cycle may provide a half-cycle of excitation in a first direction, and a half-cycle of excitation in the opposite direction. Pulse-width modulator 18 controls drivers 20 to provide, for example, pulse-width modulation for each half-cycle of excitation. The pulse-width modulation is provided at a selected duty cycle and may be controlled by processor 16. Pulse-width modulator 18 may be, for example, any circuit capable of providing control to drive H-bridge 22 through drivers 20 at the selected frequency and duty cycle. During normal system operation, the selected frequency and duty cycle are any values that provide a desired excitation of transistor 12, such as, for example, 100-200 kilohertz, and 45%, respectively.

Figure 2A:
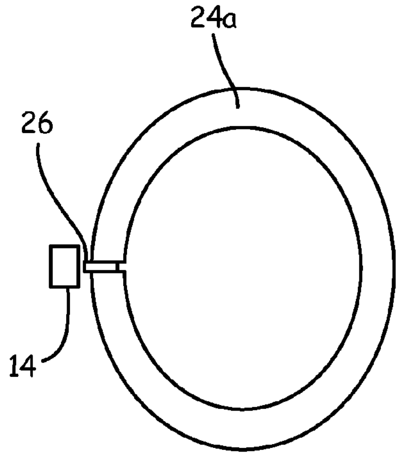
FIGS. 2A and 2B illustrate transformer magnetic cores that include Hall sensors for detecting fringing flux.
Figure 2B:
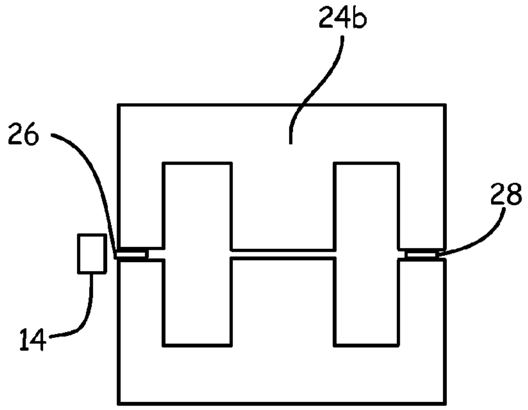

With continued reference to FIG. 1, FIGS. 2A and 2B illustrate magnetic cores 24*a* and 24*b* of transformer 12 with Hall sensor 14 for detecting fringing flux. FIG. 2A illustrates magnetic core 24*a* as a ring core. FIG. 2B illustrates magnetic core 24*b* as a pair of E-cores. While illustrated as a toroidal core and a pair of E-cores, any magnetic core configuration for transformer 12 may be implemented. Flux concentrator 26 is placed within a gap of cores 24*a* and 24*b*. In the past, a transverse Hall sensor may have been placed directly in the gap of magnetic cores 24*a* and 24*b* to detect the transverse flux of cores 24*a* and 24*b*. However, due to factors such as mechanical stresses, heat and pressure, transverse Hall sensors may become saturated, and not perform optimally in the gap. Therefore, flux concentrator 26 is implemented to concentrate a fringing flux to bidirectional Hall sensor 14. The material of flux concentrator 26 may be selected based upon, for example, the flux scaling of Hall sensor 14. Flux concentrator 26 may be, for example, copper or other non-ferrous material. Because of this, the flux from cores 24*a* and 24*b* are directed around flux concentrator 26 to Hall sensor 24. In FIG. 2B, spacer 28 is included to fill the other gap between the two E-cores and may be made of any desirable material. By measuring the fringing flux as opposed to the transverse flux within the gap, the stresses placed upon Hall sensor 24 are greatly reduced.

Figure 3B:
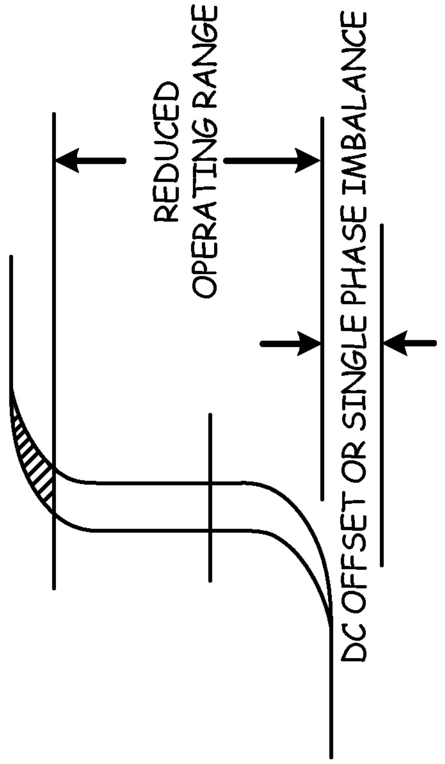
FIGS. 3A and 3B illustrate hysteresis charts for a magnetic core of a transformer.
Figure 3A:
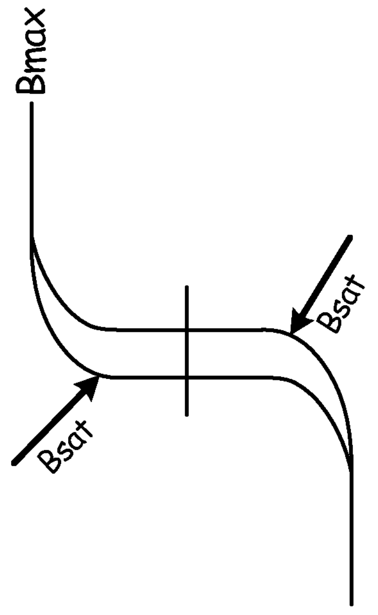
Figure 4:
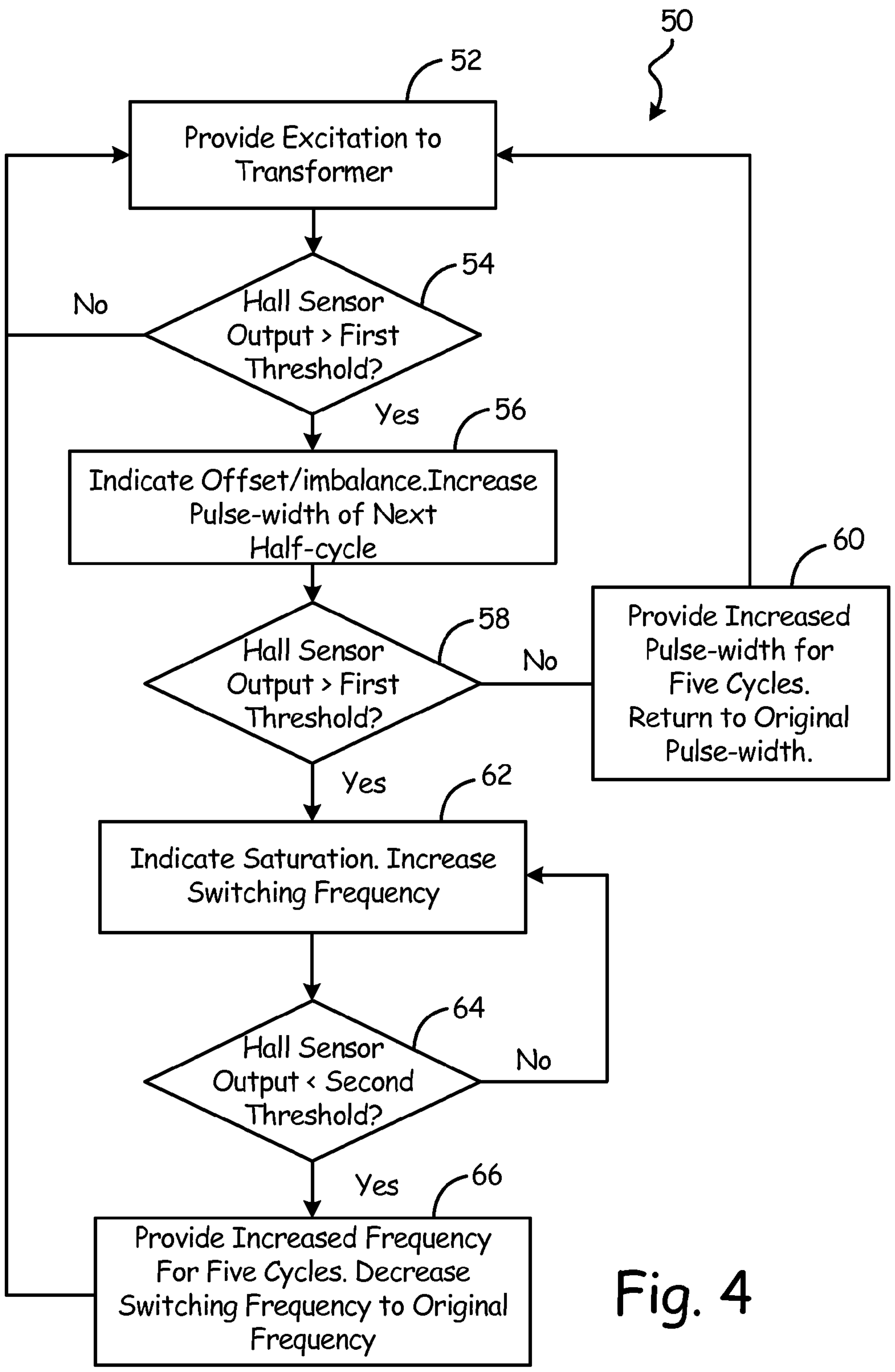
FIG. 4 is a flowchart illustrating a method for controlling magnetic saturation of a transformer.

With continued reference to FIGS. 1, 2A and 2B, FIGS. 3A and 3B illustrate hysteresis charts ("BH loops") for a magnetic core of transformer 12. FIG. 3A illustrates a BH loop for the magnetic core of transformer 12 during normal system operation. FIG. 3B illustrates a BH loop for the magnetic core if transformer 12 has incurred, for example, a DC offset or single phase imbalance. The horizontal axis represents the magnetic field applied to the magnetic core, and the vertical axis represents the magnetization of the magnetic core. A core with no magnetization begins at the center point of the chart in FIG. 3A. As a positive field is applied to the core, the magnetization increases until it reaches saturation. When the applied field is removed, the residual magnetization in the core keeps the stored magnetic field at a non-zero value. Therefore, an opposite (negative) field must be applied to reverse the polarity of the magnetization of the core. For cores that have reached saturation, an equal and opposite pulse of current (and resulting magnetic field) is not guaranteed to reverse the magnetization of the core, due to the hysteresis of the BH loop.

Prior art systems have suffered from the DC offsets and phase imbalances as illustrated in FIG. 3B. For example, prior art systems may detect saturation based upon the output current of the transformer reaching a reference value. The duty cycle may then be adjusted for the following half-cycle of current as an attempt to counteract the effects. In the following cycle, the output current may once again reach the threshold value resulting in the duty cycle once again being increased for the following half-cycle. The system may repeat in this fashion indefinitely, with the residual flux of the magnetic core increasing each cycle as a result. This behavior can lead to the offset shown in FIG. 3B. Because the saturation point of the core does not change with the offset, the operating range of the core is reduced. It is desirable to avoid these reduced operating ranges.

Hall sensor 14 may be, for example, a bipolar Hall effect sensor configured to sense magnetization of the magnetic core of transformer 12. The magnetic core of transformer 12 may be implemented, for example, as a pair of E-cores. Hall sensor 14 may be placed, for example, within or in close proximity to an air gap within the magnetic core. Hall sensor 14 provides a voltage output indicative of the magnetic flux produced by magnetization of the magnetic core of transformer 12. This output voltage may be provided to processor 16. A bipolar Hall effect sensor may be chosen due to its capability of providing outputs indicative of magnetization in all points of the BH loop illustrated in FIG. 3A.

Processor 16 receives the voltage from Hall sensor 14 and compares it with threshold values to determine the operating point of the magnetic core of transformer 12. These reference values may be based on, for example, the expected BH loop of the magnetic core as illustrated in FIG. 3A. The points indicated as $B_{SAT}$ in FIG. 3A illustrate thresholds beyond which the magnetic core no longer operates in a linear fashion. It may be desirable to ensure operation of the core remains within the linear region located between the two $B_{SAT}$ thresholds. Operation outside of the linear region may lead to saturation of the core. It may also be desirable to ensure that action taken to counteract the operation outside the linear region does not result in an offset or imbalance.

Processor 16 may sample the voltage from Hall sensor 14 at any time to determine an operating point of the magnetic core. For example, processor 16 may sample the output of Hall sensor 14 during, or following, the pulse of each half-cycle of the bidirectional excitation of transformer 12. Processor 16 may compare the output of the Hall sensor with threshold values that may be based upon, for example, the BH loop illustrated in FIG. 3A in order to determine an operating point of the magnetic core. These threshold values may be implemented within a lookup table, or in any other way that allows comparison of the output of Hall sensor 14 with threshold values. Although illustrated as a digital signal processor in FIG. 1, processor 16 may be implemented as any electronic circuit capable of comparing a voltage with threshold values, such as a field programmable gate array (FPGA) or any other digital circuit.

Processor 16 may control pulse-width modulator 18 to control excitation of transformer 12 based upon the determined operating point of the magnetic core. For example, if processor 16 determines that the operating point is greater than a first threshold, processor 16 may control pulse-width modulator 18 to increase the pulse-width of the following half-cycle of excitation in the opposite direction. The first threshold may be selected, for example, to correspond with the $B_{SAT}$ values shown in FIG. 3A. For example, $B_{SAT}$ may correspond to a value of positive or negative five hundred gauss. Therefore, if the magnitude of the output of Hall sensor 14 exceeds five hundred gauss, processor 16 will, for example, set a flag indicating that a possible offset or imbalance condition has been detected.

Following detection of operation outside the linear region, processor 16 controls the following half-cycle in an attempt to move operation of the transformer back into the linear region of the BH loop. Processor 16 may control pulse-width modulator 18 to increase the pulse-width of the following half-cycle by, for example, five percent. Because the following half-cycle provides excitation in the opposite direction, by increasing the pulse-width, the operating point of the magnetic core may return to the linear portion of the BH loop as shown in FIG. 2A. Following the extended pulse-width, processor 16 may sample the output of Hall sensor 14 to determine if the offset or imbalance condition has been eliminated.

Following the extended pulse, the output of Hall sensor 14 may be compared to a second threshold to determine if core is once again operating in the linear region. If the magnitude of the output of the Hall sensor 14 exceeds the second threshold magnitude, the processor may set a flag that is indicative of saturation of the magnetic core. If the magnitude of the output does not exceed the second threshold magnitude, saturation is not indicated. In order to allow system 10 to stabilize and eliminate any possible offsets or imbalances, processor 16 may provide the extended pulse-width for the respective half-cycle for a selected number of cycles such, for example, five cycles. Processor 16 may include, for example, a cycle counter to track the number of cycles for which the respective half-cycle has an extended duty cycle.

If processor 16 has indicated a saturation condition, processor 16 may control pulse-width modulator 18 to increase the frequency of the cycles of bidirectional excitation of transformer 12. By increasing the frequency, the period of excitation for each half-cycle is reduced, thereby reducing the magnetic flux generated by transformer 12 for each half-cycle. The frequency may be increased by any selected amount such as, for example, ten percent. Processor 16 may then continue to sample the output of Hall sensor 14, for example, every half-cycle or full cycle to determine if the magnetic core is still in saturation. For example, if the magnitude of the output of Hall sensor 14 continues to exceed the second threshold, processor 16 may once again increase the frequency by the selected amount. Once the magnitude of the output of Hall sensor 14 no longer exceeds the second threshold magnitude, processor 16 determines that the magnetic core is no longer in saturation. To allow system 10 to stabilize, processor 16 may continue to excite transformer 12 at the present frequency for a selected number of cycles such as, for example, five cycles. Processor 16 may utilize, for example, a cycle counter to track the number of cycles for which the cycles have been run at the present frequency. By providing control of both the duty cycle and the frequency, the operating point of the magnetic core may be better controlled to ensure operation in the linear operating region of FIG. 3A. Following the selected number of cycles, the frequency of excitations is reset to the original value. Resetting the frequency following the correction of the saturation condition may be done in order to avoid any losses due to, for example, excess heat generated by the transformer at the greater frequencies.

With continued reference to FIGS. 1, 2A, 2B, 3A and 3B, FIG. 4 is a flowchart illustrating method 50 of controlling magnetic saturation of transformer 12. At step 52, system 10 is operating normally. Transformer 12 is driven by pulse-width modulator 18 through drivers 20 and H-bridge 22. Transformer 12 is driven at a selected frequency and duty cycle. Processor 16 monitors magnetization of the core of transformer 12 through Hall sensor 14 each half-cycle of excitation.

At step 54, processor 16 compares the magnitude of the output of Hall sensor 14 with a first threshold magnitude. The first threshold value may be indicative of a saturation level of the magnetic core, such as the $B_{SAT}$ points indicated in FIG. 3A. For example, if the magnetic core (ferrite) of transformer 12 operates normally in a range between positive four hundred gauss and negative four hundred gauss, the first threshold level may be, for example, five hundred gauss or negative five hundred gauss depending upon the polarity of the present half-cycle. If the output of Hall sensor 14 indicates that the magnitude of the magnetization of the core exceeds the first threshold magnitude (i.e., greater than five hundred gauss or less than negative five hundred gauss), method 50 proceeds to step 56. If the magnitude of the output of Hall sensor 14 does not exceed the threshold value, method 50 returns to step 52.

At step 56, processor 16 may set a flag to indicate a possible offset or imbalance condition due to operation outside of the normal linear region. If the pulse for the present half-cycle has not completed, processor 16 also terminates the present pulse. Processor 16 controls pulse-width modulator 18 to increase the duty cycle of the following half-cycle by a selected amount such as, for example, five percent. At step 58, processor 16 samples the output of Hall sensor 14 following the extended pulse. If the output magnitude does not exceed a second threshold magnitude, method 50 proceeds to step 60. If the output magnitude exceeds the second threshold magnitude, processor 16 determines that the core is saturated, and method 50 proceeds to step 62. The second threshold magnitude may be any selected point on the BH curve illustrated in FIG. 3A and may be equal to the first threshold magnitude. At step 60, processor 18 continues to provide the extended pulse for the respective half-cycle for a selected number of cycles such as, for example, five cycles. This may be done to counteract the effects of a possible offset or imbalance and stabilize the system. Following the five cycle counts, method 50 returns to step 52.

At step 62, it has been determined that the magnetic core is saturated. Processor 16 may set a flag and control pulse-width modulator 18 to increase the frequency of the bidirectional excitation of transformer 12. The frequency is increased by any desirable amount such as, for example, ten percent. At step 64, processor 16 determines if the output magnitude of Hall sensor 14 no longer exceeds the second threshold magnitude. If it no longer exceeds the second threshold magnitude, method 50 proceeds to step 66. If it continues to exceed the second threshold magnitude, method 50 returns to step 62 and the frequency is once again increased by, for example, ten percent. At step 66, saturation is no longer detected, and processor 16 controls pulse-width modulator 18 to hold the frequency at the present value for a selected number of cycles such as, for example, five cycles. This allows the circuit and core to stabilize prior to returning to the default frequency.

Discussion of Possible Embodiments

The following are non-exclusive descriptions of possible embodiments of the present invention.

A method of controlling saturation of a magnetic core of a transformer includes, among other things, providing cycles of bidirectional excitation to a transformer at a first frequency and a first duty cycle; sensing, using a Hall sensor, a first field value of the magnetic core; adjusting, using a processor, the first duty cycle in response to the magnitude of the first field value exceeding a first threshold magnitude; sensing, using the Hall sensor, a second field value of the magnetic core in response to the magnitude of the first field value exceeding the first threshold magnitude; and adjusting, using the processor, the first frequency in response to a magnitude of the second field value exceeding a second threshold magnitude.

A further embodiment of the foregoing method, wherein providing the cycles of bidirectional excitation to the transformer includes providing, for each of the cycles of the bidirectional current, a first current pulse to the transformer during a first half-cycle at the first duty cycle; and providing, for each of the cycles of the bidirectional current, a second current pulse to the transformer during a second half-cycle at the first duty cycle.

A further embodiment of any of the foregoing methods, wherein sensing, using the Hall sensor, the first field value of the magnetic core includes sensing the first field value following the first current pulse of a first cycle of the cycles of bidirectional current.

A further embodiment of any of the foregoing methods, wherein adjusting, using the processor, the first duty cycle includes providing the second current pulse of the first cycle to the transformer during the second half-cycle at a second duty cycle greater than the first duty cycle.

A further embodiment of any of the foregoing methods, wherein sensing, using the Hall sensor, the second field value comprises sensing the second field value following the second current pulse of the first cycle.

A further embodiment of any of the foregoing methods, wherein adjusting, using the processor, the first frequency in response to the magnitude of the second field value exceeding the second threshold magnitude includes providing the cycles of bidirectional excitation to the transformer at a second frequency greater than the first frequency; sensing, using the Hall sensor, a third field value of the magnetic core; and increasing, using the processor, the second frequency in response to a magnitude of the third field value exceeding the second threshold magnitude.

A further embodiment of any of the foregoing methods, wherein adjusting, using the processor, the first frequency further includes holding, using the processor, the cycles of bidirectional excitation at the second frequency for a selected cycle count and providing the cycles of bidirectional excitation at the first frequency.

A further embodiment of any of the foregoing methods, wherein the second frequency is at least ten percent greater than the first frequency.

A further embodiment of any of the foregoing methods, further including holding, using the processor, the second current at the second pulse-width for a selected cycle count in response to the magnitude of the second field value not exceeding the second threshold magnitude.

A further embodiment of any of the foregoing methods, wherein the selected cycle count is greater than five cycles.

A system for controlling saturation of a magnetic core of a transformer includes a transformer control circuit, a Hall sensor, and a processor. The transformer control circuit is configured to provide cycles of bidirectional excitation to the transformer at a first frequency and a first duty cycle. The Hall sensor is configured to output a first field value of the magnetic core during a first half-cycle of each of the cycles of bidirectional excitation and a second field value during a second half-cycle of each of the cycles of bidirectional excitation. The processor is configured to increase the first duty cycle to a second duty cycle in response to a magnitude of the first field value exceeding a first threshold magnitude. The processor is further configured to increase the first frequency to a second frequency in response to both the magnitude of the first field value exceeding the first threshold magnitude and the magnitude of the second field value exceeding a second threshold magnitude.

A further embodiment of the foregoing system, wherein the Hall sensor is a bidirectional Hall Effect sensor.

A further embodiment of any of the foregoing systems, wherein the first threshold magnitude and the second threshold magnitude are based upon expected saturation points of the magnetic core.

A further embodiment of the foregoing system, wherein the processor is configured to hold the second duty cycle for a selected count of the cycles of bidirectional excitation in response to both the magnitude of the first field value exceeding the first threshold magnitude and the magnitude of the second field value not exceeding the second threshold magnitude.

A further embodiment of the foregoing system, wherein the transformer control circuit comprises a pulse-width modulator circuit, and an H-bridge circuit.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of controlling saturation of a magnetic core of a transformer, the method comprising:

providing cycles of bidirectional excitation to a transformer at a first frequency and a first duty cycle;

sensing, using a Hall sensor, a first field value of the magnetic core;

adjusting, using a processor, the first duty cycle in response to the magnitude of the first field value exceeding a first threshold magnitude;

sensing, using the Hall sensor, a second field value of the magnetic core in response to the magnitude of the first field value exceeding the first threshold magnitude; and adjusting, using the processor, the first frequency in response to a magnitude of the second field value exceeding a second threshold magnitude.

2. The method of claim 1, wherein providing the cycles of bidirectional excitation to the transformer comprises:

providing, for each of the cycles of the bidirectional current, a first current pulse to the transformer during a first half-cycle at the first duty cycle; and providing, for each of the cycles of the bidirectional current, a second current pulse to the transformer during a second half-cycle at the first duty cycle.

3. The method of claim 2, wherein sensing, using the Hall sensor, the first field value of the magnetic core comprises:

sensing the first field value following the first current pulse of a first cycle of the cycles of bidirectional current.

4. The method of claim 3, wherein adjusting, using the processor, the first duty cycle comprises:

providing the second current pulse of the first cycle to the transformer during the second half-cycle at a second duty cycle greater than the first duty cycle.

5. The method of claim 4, wherein sensing, using the Hall sensor, the second field value comprises sensing the second field value following the second current pulse of the first cycle.

6. The method of claim 5, wherein adjusting, using the processor, the first frequency in response to the magnitude of the second field value exceeding the second threshold magnitude comprises:

providing the cycles of bidirectional excitation to the transformer at a second frequency greater than the first frequency;

sensing, using the Hall sensor, a third field value of the magnetic core; and increasing, using the processor, the second frequency in response to a magnitude of the third field value exceeding the second threshold magnitude.

7. The method of claim 6, wherein adjusting, using the processor, the first frequency further comprises:

holding, using the processor, the cycles of bidirectional excitation at the second frequency for a selected cycle count; and providing the cycles of bidirectional excitation at the first frequency.

8. The method of claim 6, wherein the second frequency is at least ten percent greater than the first frequency.

9. The method of claim 4, further comprising:

holding, using the processor, the second current at the second pulse-width for a selected cycle count in response to the magnitude of the second field value not exceeding the second threshold magnitude.

10. The method of claim 9, wherein the selected cycle count is greater than five cycles.

11. A system for controlling saturation of a magnetic core of a transformer, the system comprising:

a transformer control circuit configured to provide cycles of bidirectional excitation to the transformer at a first frequency and a first duty cycle;

a Hall sensor configured to output a first field value of the magnetic core during a first half-cycle of each of the cycles of bidirectional excitation and a second field value during a second half-cycle of each of the cycles of bidirectional excitation; and a processor configured to increase the first duty cycle to a second duty cycle in response to a magnitude of the first field value exceeding a first threshold magnitude, and wherein the processor is further configured to increase the first frequency to a second frequency in response to both the magnitude of the first field value exceeding the first threshold magnitude and a magnitude of the second field value exceeding a second threshold magnitude.

12. The system of claim 11, wherein the Hall sensor is a bidirectional Hall Effect sensor.

13. The system of claim 11, wherein the first threshold magnitude and the second threshold magnitude are based upon expected saturation points of the magnetic core.

14. The system of claim 11, wherein the processor is configured to hold the second duty cycle for a selected count of the cycles of bidirectional excitation in response to both the magnitude of the first field value exceeding the first threshold magnitude and the magnitude of the second field value not exceeding the second threshold magnitude.

15. The system of claim 11, wherein the transformer control circuit comprises a pulse-width modulator circuit, and an H-bridge circuit.

* * * * *